(12) United States Patent
Marcoux et al.

(10) Patent No.: US 7,717,398 B2
(45) Date of Patent: May 18, 2010

(54) DAMPER ASSEMBLY EXPLOITING A CRANKSHAFT

(75) Inventors: Daniel Marcoux, St-Charles-de-Drummond (CA); Christian Légaré, Drummondville (CA); Martin Gagnon, St-Charles-de-Drummond (CA); Eric Charlebois, St-Nicéphore (CA); Normand Juneau, Drummondville (CA)

(73) Assignee: Venmar Ventilation Inc., Drummondville (CA)

( * ) Notice: Subject to any disclaimer, the term of this patent is extended or adjusted under 35 U.S.C. 154(b) by 181 days.

(21) Appl. No.: 12/003,334

(22) Filed: Dec. 21, 2007

(65) Prior Publication Data

US 2008/0105844 A1 May 8, 2008

Related U.S. Application Data

(62) Division of application No. 11/195,697, filed on Aug. 3, 2005, now Pat. No. 7,328,883.

(30) Foreign Application Priority Data

Jan. 11, 2005 (CA) .................................. 2492257

(51) Int. Cl.
*F16K 1/18* (2006.01)

(52) U.S. Cl. .................. 251/129.11; 251/297; 251/298; 251/337

(58) Field of Classification Search ............ 251/129.11, 251/129.12, 129.13, 297, 298, 303, 337, 251/305

See application file for complete search history.

(56) References Cited

U.S. PATENT DOCUMENTS

| | | | | | |
|---|---|---|---|---|---|
| 2,833,511 | A | * | 5/1958 | Fletcher | 251/160 |
| 3,159,376 | A | * | 12/1964 | Ray | 251/308 |
| 3,272,223 | A | * | 9/1966 | Sass | 251/161 |
| 4,260,129 | A | * | 4/1981 | Groenefeld | 251/77 |
| 4,632,148 | A | * | 12/1986 | Stark et al. | 251/297 |
| 4,770,392 | A | * | 9/1988 | Schmidt | 251/158 |
| 4,951,712 | A | * | 8/1990 | Becker | 251/297 |
| 5,303,897 | A | * | 4/1994 | Tengesdal et al. | 251/298 |
| 5,330,157 | A | * | 7/1994 | Dern et al. | 251/162 |
| 5,551,666 | A | * | 9/1996 | Irnich | 251/160 |
| 5,755,427 | A | * | 5/1998 | Koskinas | 251/188 |
| 5,771,707 | A | * | 6/1998 | Lagace et al. | 62/271 |
| 5,822,984 | A | * | 10/1998 | Park | 251/298 |
| 5,876,014 | A | * | 3/1999 | Noritake et al. | 251/303 |
| 5,937,835 | A | * | 8/1999 | Turner et al. | 251/129.13 |
| 6,209,622 | B1 | * | 4/2001 | Lagace et al. | 165/8 |
| 6,439,091 | B1 | | 8/2002 | Dibbern et al. | |
| 2005/0224743 | A1 | * | 10/2005 | Boardman et al. | 251/308 |

* cited by examiner

*Primary Examiner*—John Bastianelli

(57) ABSTRACT

A damper assembly exploiting a crankshaft to induce displacement of a damper means from one position to another.

6 Claims, 7 Drawing Sheets

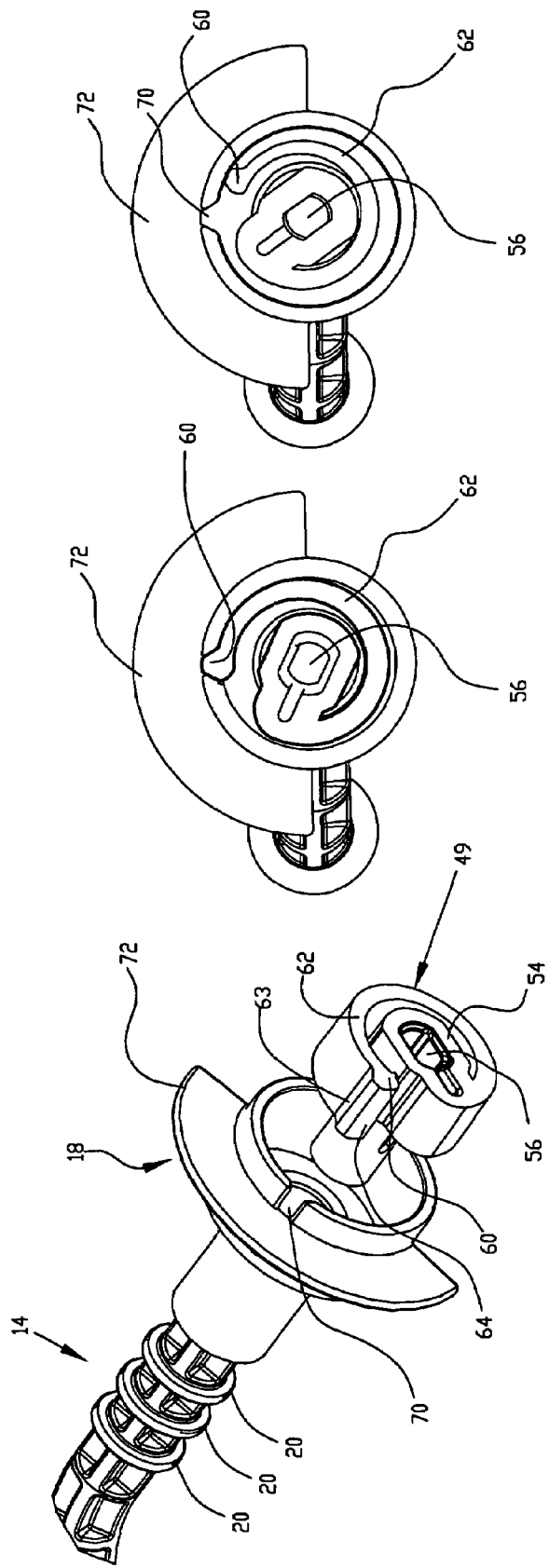

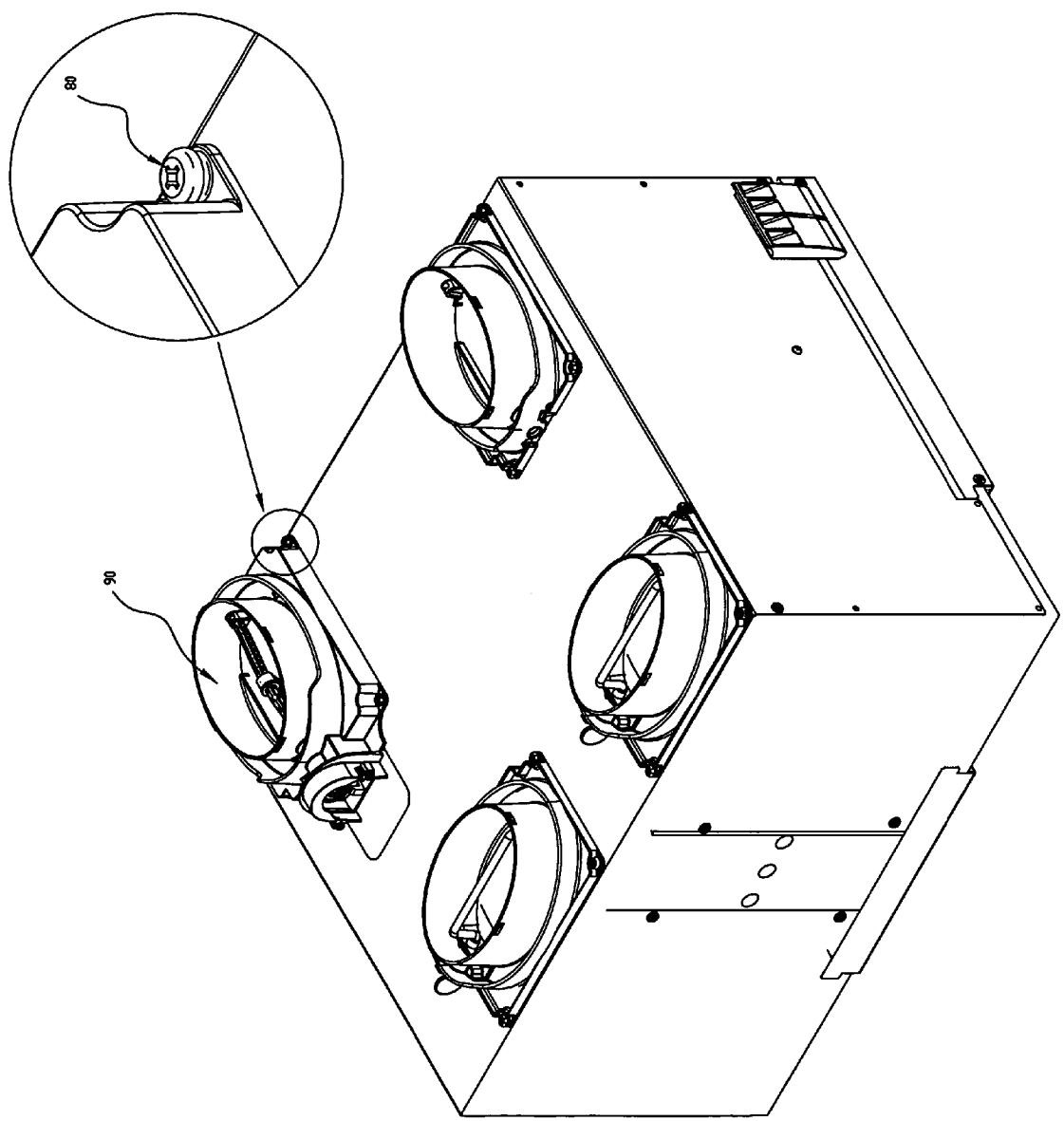

DAMPER ASSEMBLY EXPLOITING A CRANKSHAFT

The present application is a division of patent application Ser. No. 11/195,697 filed on Aug. 3, 2005 now U.S. Pat. No. 7,328,883. The entire content of said U.S. application Ser. No. 11/195,697 is herein incorporated by reference.

FIELD OF THE INVENTION

The present invention relates to a damper assembly for a ventilation duct. The present invention in particular relates to a damper assembly exploiting a crankshaft to induce displacement of a damper means from one position to another. The present invention further relates to a damper assembly exploiting a damper (electric) motor the shaft of which rotates in a single rotational direction (i.e. the motor is not reversible). The present invention also relates to a damper assembly exploiting a coupling release means for releasably coupling an (electric motor) shaft to said crankshaft for rotation of the crankshaft by the motor shaft. The present invention additionally relates to a damper assembly exploiting a sensor means for detecting the position of a damper e.g. in relation to its predetermined correct open and closed states (e.g. damper motor off) including maximum open state as well as jammed open or jammed closed states.

BACKGROUND OF THE INVENTION

It is known to use motorized damper assemblies for air ventilation to induce a damper means to pass from one position to another such as from a closed position to an open position. Such system are known to make use of switching mechanism and the like which can command a (electric) motor to change the rotational direction of its shaft in order to reverse the displacement of a damper means.

It would thus be advantageous to have a damper which could avoid the use of such reverse switching mechanisms, i.e. to use a motor the shaft of which rotates in a single rotational direction. It in particular would be advantageous to have a damper assembly which could use a crankshaft for damper means displacement. It would further be advantageous to have a damper assembly that could disconnect a driving shaft of a (electric) motor from a damper means i.e. to avoid injury to a person examining the damper means as well as to the damper means itself should such disconnection not be achieved. It furthermore would be advantageous to be able to have a means for detecting the position of a damper means e.g. in relation to its open and closed states including maximum open state as well as intermediate open states and including jammed open or jammed closed states. It would be advantageous to have a system that could troubleshoot itself knowing exactly which component failed or jammed and re-initialize itself or stop itself if permanent damage occurred.

SUMMARY OF THE INVENTION

Thus the present invention in an aspect provides a damper assembly, comprising:

a support means defining an opening;

damper means pivotally mounted or connected to said support means by pivot connection means, a crankshaft means rotationally mounted or connected to said support means, said crankshaft means comprising a throw element, wherein said damper means is coupled to said throw element of said crankshaft means by a connector drive arm element, said throw element being rotatably connected to said connector drive arm element and said connector drive arm element being pivotably connected to said damper means such that a complete rotation of said crankshaft means in a single direction is able to induce said damper means to swing about said pivot connection means from a first (i.e. closed or open) damper position to a second (i.e. open or closed) damper position and back to said first damper position for adjusting air flow through said opening.

The present invention further provides a damper assembly wherein said assembly includes a coupling release means for releasably coupling a motor shaft (e.g. electric motor shaft) to said crankshaft means for rotation of the crankshaft means by the motor shaft, wherein the coupling release means is configured such that when a predetermined (i.e. rotational or twisting) force is produced by the motor, interlocking between the crankshaft means and the motor is released. Thus the present invention also provides a damper assembly wherein said motor provides a rotational force in a single direction.

The present invention in a further particular aspect provides a coupling release component for releasably coupling a shaft of a motor (e.g. electric motor shaft) to a crankshaft means for rotation of the crankshaft means by the motor shaft, the coupling release component comprising:

a rotation lock means comprising axially disposed first gripping means for connecting the lock means to the shaft of a motor for inducing rotation of said lock means by said motor, a slip coupling means comprising second gripping means disposed radially outwardly relative to the first gripping means configured to releasably engage or interlock with a corresponding third gripping means of a further coupling means for connecting the coupling release component to said crankshaft means for the rotation thereof, and resilient mounting means mounting said second gripping means to said first gripping means so as to be able to exert a radially outward force on the second gripping means so as to radially bias the second gripping means into interlocking engagement with the third gripping means, wherein the second gripping means and the corresponding third gripping means are configured such that when a predetermined (i.e. rotational or twisting) force sufficient to overcome the radially outward bias of the resilient mounting means is produced by the motor, the interlocking between the second and third gripping means is released such that the second gripping means slips in relation to the further coupling means.

The present invention in accordance with a further aspect provides a coupling release component wherein the second gripping means and the corresponding third gripping means are have angled engaging surfaces that are configured such that when a predetermined (i.e. rotational or twisting) force sufficient to overcome the radial bias of the spring is produced, the interlocking between the second and third gripping means is released such that the second gripping means slips in relation to the further coupling means.

The present invention in accordance with a further aspect provides a damper assembly further comprising damper position detection means comprising a first detection portion mounted (i.e. fixed) to the support means and a second detection portion mounted (i.e. fixed) to the crankshaft means, said damper position detection means being configured for detection of the disposition of the damper means in relation to its open and closed states including maximum open state as well as intermediate open states and including jammed open or jammed closed states.

BRIEF DESCRIPTION OF THE DRAWINGS

The present invention will be described below in detail with the aid of the accompanying drawings, in which example embodiments of the invention are illustrated:

FIGS. 7, 8 and 9 schematically illustrate the example first gripping means, second gripping means and third gripping means of the releasable coupling means of the present invention as well as the interlocking position of the second gripping means and third gripping means and a slippage position thereof;

FIG. 14 is a perspective schematic view showing a damper assembly in accordance with the present invention attached to the housing of a ventilation device so as to define a respective part of an air path defined by the ventilation device.

DETAILED DESCRIPTION OF EXAMPLE EMBODIMENTS

Figure 1:
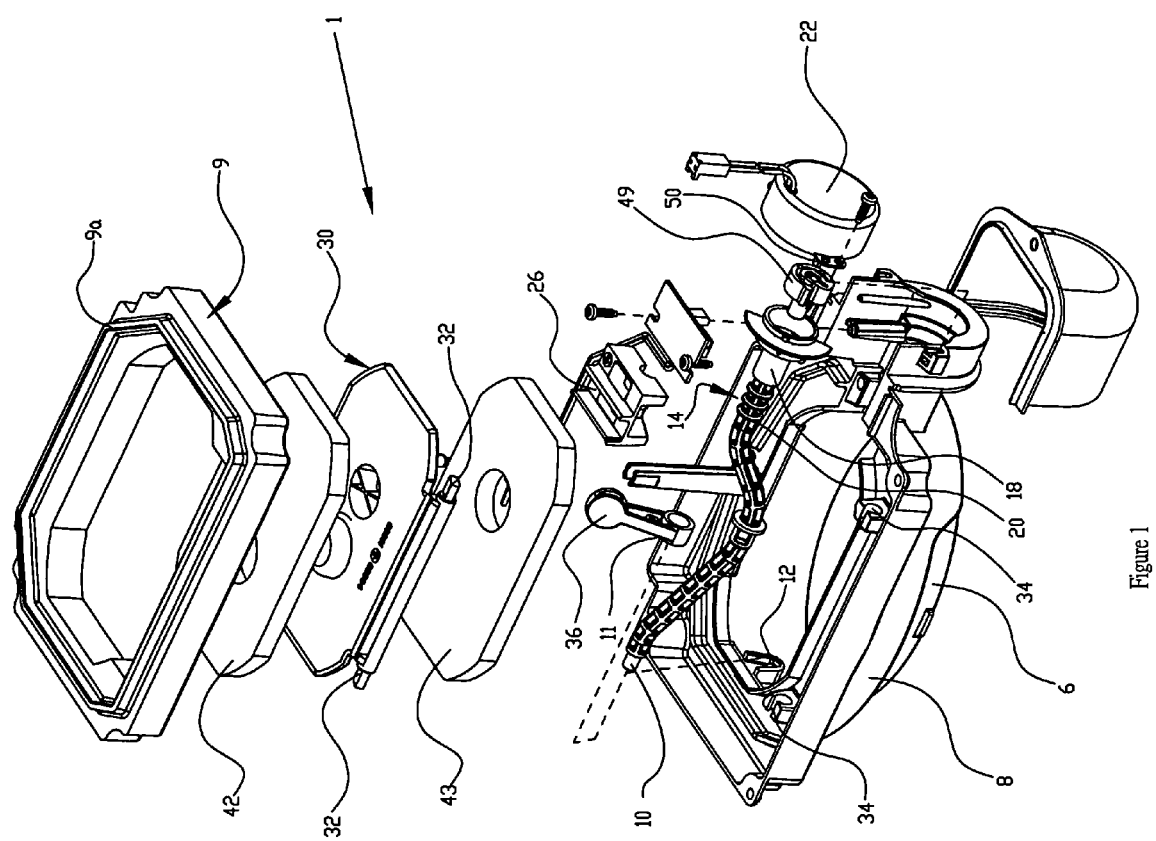
FIG. 1 is an exploded perspective view of an example embodiment of a motorized damper assembly in accordance with the present invention provided with a crankshaft means and a coupling release means.
Figure 4:
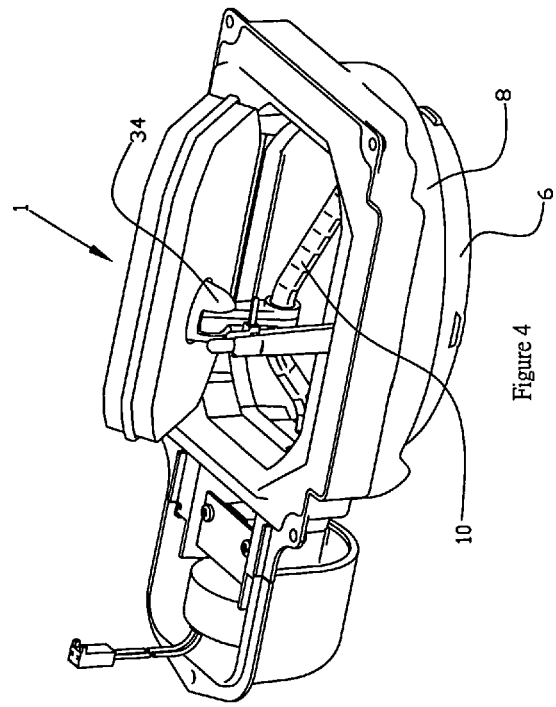
FIG. 4 is a perspective view illustrating the assembled damper of FIG. 1 with the damper means in open position (adapter portion removed)
Figure 3:
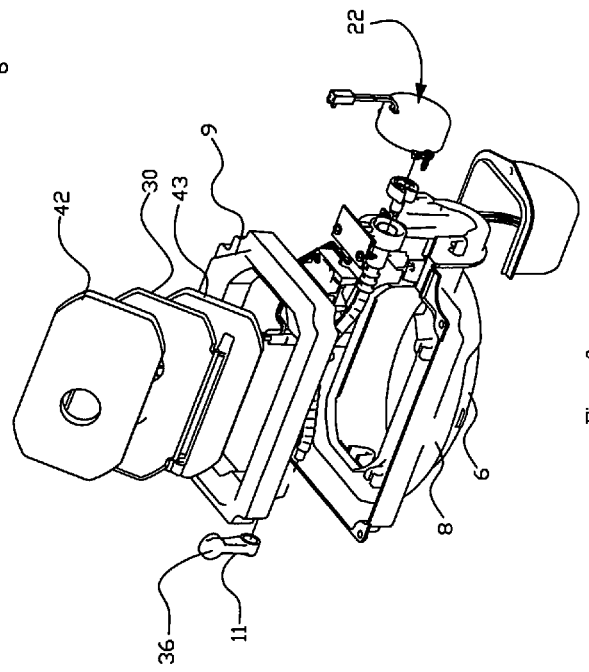
FIG. 3 is a further exploded perspective view from a further angle of the example embodiment of a damper assembly shown in FIG. 1 including shading.
Figure 2:
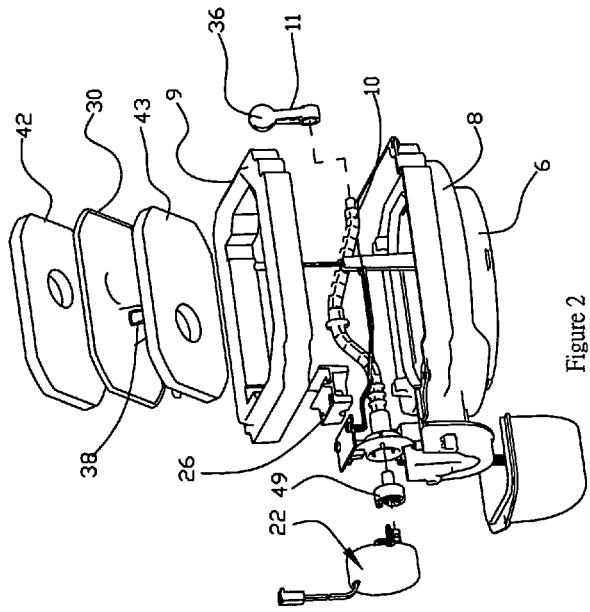
FIG. 2 is another exploded perspective view from another angle of the example embodiment of a damper assembly shown in FIG. 1 including shading.

Referring to FIGS. 1 to 5, 5a and 5b, these figures illustrate a damper assembly 1 in accordance with the present invention wherein the same reference numerals refer to the same elements.

The assembly 1 comprises a support means which includes a collar body comprising an inner collar member 6 and an outer collar member 8. The support means as shown also has an example adapter portion 9 for connection to a ventilation box (not shown) by tongue and groove connection means (the tongue engagement member 9a being shown). Other types of connection means may of course be used as desired or necessary to connect the damper assembly to ventilation duct type elements. The collar members 6 and 8 are spaced apart and are configured to accommodate therebetween a like shaped insulated ventilation or heating pipe. As may be seen the support body defines an opening.

A crankshaft means generally designated by the reference numeral 10 is also provided by the damper assembly. The crankshaft means 10 has the form of a rod like member having an offset portion with a U-shaped like form forming a throw to which a connector drive arm 11 is rotationally attached.

Figure 6:
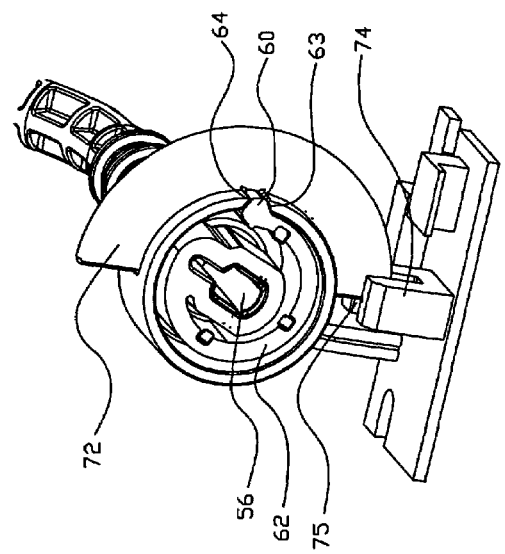
FIG. 6 is a schematic partially cut away view exposing the motor of the assembly in FIG. 4 and the example coupling release means.

The crankshaft means 10 is rotationally connected or mounted to the support means (i.e. in relation to the opening as defined by the support means). One end of the crankshaft means 10 is rotatably engaged in a socket like element 12 in a motor coupler member 18. The shaft 14 has circular retention discs 20 which rotatably engage correspondingly shaped circular channels (see FIG. 6); as may be understood a half portion of the circular channels is defined by the underside of the retainer member 26. The retainer member 26 is maintained in place by a suitable adhesive or glue or screw or mechanical press fit. Thus the retention disc 20 retain the shaft member 14 in place when the shaft member 14 is urged to rotate by a motor 22 rotationally engaging the motor coupling means 18. Any suitable motor may for example be used for this purpose; such as for example a synchronous motor as made by Hon Hamn motor Enterprise Co, Ltd. (i.e. part number CND02-004)).

The damper assembly also is provided with a damper member 30 which is also pivotally connected or mounted to the support means (i.e. in relation to the opening defined by the support means). The damper member 30 is mounted at each side by a pin-socket type pivot connection (elements 32 and 34) which allows the damper member 30 to swing between a first (i.e. blocking) position as shown and a damper open position (see FIGS. 5a and 5b).

As mentioned above a connector drive arm 11 is rotationally attached at one end thereof to the crankshaft means 10 (i.e. by a drive arm channel socket) which allows for rotational movement of the drive arm about the crankshaft means 10 (or stated otherwise for rotational movement of the crankshaft means in the drive arm channel socket). The other end of the connector drive arm 11 comprises a circular tab like disc element 36 which is engaged in a hollow pivot engagement member 38 for coupling to the damper member 30. The pivot engagement member 38 comprises a slot 40 (see FIG. 11) for providing side ways access of the tab like disc element 36 into the interior of the pivot engagement member 38 at which point the tab member 36 is rotated 90 degrees to engage it in the interior thereof for pivot like movement of the tab like disc element 36 as the crankshaft rotates.

The damper member 30 is provided on each side thereof with a foam layer 42 and 43. These foam layers are compressable and may be exploited to provide fluid tight seals around openings when in either the open or closed position (shown for the closed position seen in FIG. 5a).

Turning more particularly to FIGS. 1, 7, 8, 9 and 10 these figures illustrate an example embodiment of a coupling release component 49 for releasably coupling a shaft 50 of the (electric) motor 22 to the crankshaft means 10 for rotation of the crankshaft means 10 by the motor shaft 50.

The coupling release component 49 comprises a rotation lock means 54 comprising axially disposed first gripping means 56 (i.e. opening) for connecting the lock means 54 to the shaft 50 of motor 22 for inducing rotation of said lock means 54 by said motor 52. As may be appreciated the first gripping means 56 comprises an opening which is rectangular in shape for engaging a correspondingly shaped end of the shaft 50.

The coupling release component 49 also comprises a slip coupling means which comprises second gripping means 60 disposed radially outwardly relative to the first gripping means 56.

The coupling release component 49 further comprises resilient mounting means 62. The resilient mounting means 62 mounts said second gripping means 60 to said first gripping means 56 so as to be able to exert a radially outward force on the second gripping means 60. The second gripping means 60 is mounted to the first gripping means 56 such that, in relation to a predetermined direction of rotation, the second gripping means trails the connection between the two gripping means; for example referring to FIGS. 8 and 9 the predetermined direction of rotation is clockwise. The second gripping means 60 may be of any suitable material keeping in mind its function (e.g. a metal material; a plastics material such as for example a flexible polymeric based material, e.g. a glass fiber filed nylon).

The second gripping means 60 has inwardly sloped surfaces 63 and 64 which can releasably engage or interlock with corresponding surfaces of third gripping means (i.e. the slot generally designated by the reference numeral 70—see FIG. 7) of the motor coupler member 18 for connecting the coupling release component to the crankshaft 10 for the rotation thereof by the motor 52.

Turning to FIGS. 7 and 8 the coupling release component 49 is able to slide into the recess provided by the motor coupler member 18 such that the second gripping means 60 is in the slot 70.

As mentioned above the resilient mounting means 62 mounts said second gripping means 60 to said first gripping means 56 so as to be able to exert a radially outward force on the second gripping means 60 so as to radially bias the second gripping means 60 into interlocking engagement with the third gripping means (i.e. slot 70). The second gripping means 60 and the corresponding third gripping means (i.e. slot 70) are configured such that when a predetermined (rotational or twisting) force sufficient to overcome the radially outward bias of the resilient mounting means 60 is produced (i.e. by the motor 22), the interlocking between the second and third gripping means is released such that the second gripping means slips in relation to the further coupling means (see FIG. 9 which illustrate such slippage. The needed predetermined (rotational or twisting) force may be determined in any suitable manner (e.g. by empirical methods). Such force may for example be produced in reaction to an obstacle in the path of the damper member 30 which does not allow it to complete its movement cycle e.g. jams the damper member 30 in an open state.

In order to facilitate detection and correction of a jammed damper member 30 the damper assembly may be provided with any type of desired damper position detection means (e.g. based on light detection (e.g. visible, infra red, etc.), magnetic field detection). For the example embodiment(s) shown in the figures the embodiment(s) is provided with a half circle detection disc 72, a light source element 74 and light detection element 75 (see in particular FIGS. 10 and 11). The light source element 74 may be a light emitting diode; (i.e. the light source element 74 and light detection element 75 may for example be a Phototransistor Optical Interrupter switch such as part number QVE00118 from Fairchild Semiconductor).

Figure 5:
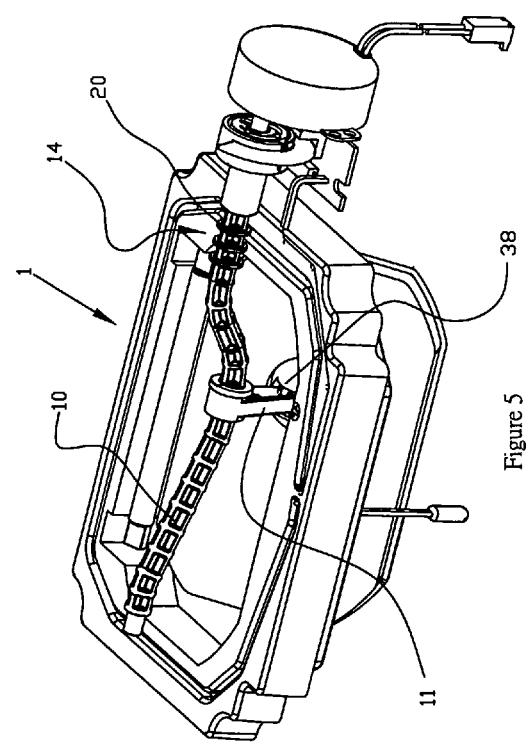
FIG. 5 is a further perspective view illustrating the assembled damper as shown in FIG. 4 but with the collar portion of the support means cut away.
Figure 5A:
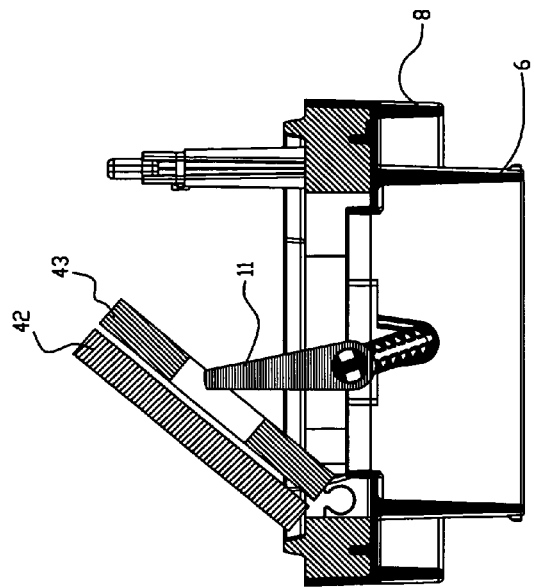
FIG. 5a is a schematic cross-sectional view of the assembled damper as shown in FIG. 4 with the damper means in closed position (the damper means being cut away)
Figure 5B:
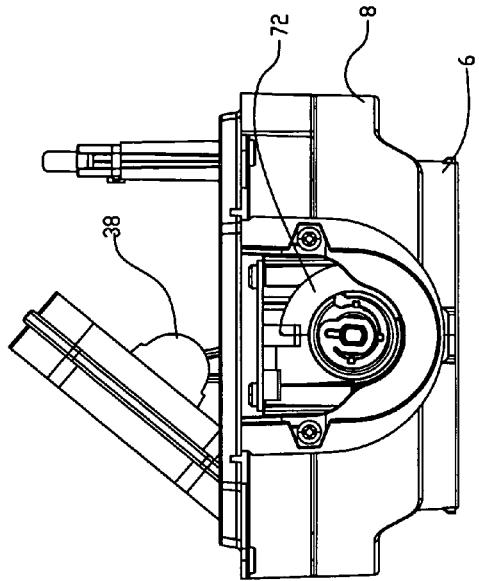
FIG. 5b is a schematic cross-sectional view of the assembled damper as shown in FIG. 4 with the damper means in open position (the damper means being cut away)
Figure 5C:
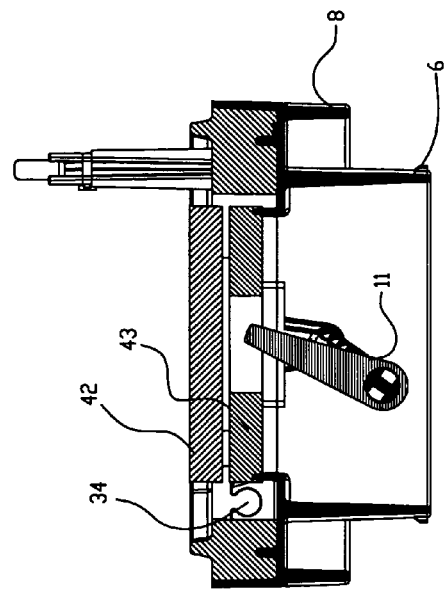
FIG. 5c is a schematic partially cut away view in the direction of the motor of the assembled damper as shown in FIG. 5a with the damper means in closed position showing the position of the disc detector.
Figure 5D:
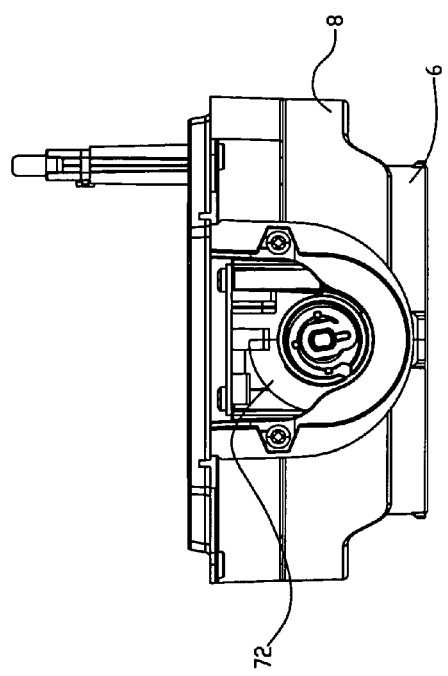
FIG. 5d is a schematic partially cut away view in the direction of the motor of the assembled damper as shown in FIG. 5b with the damper means in open position showing the position of the disc detector.
Figure 10:
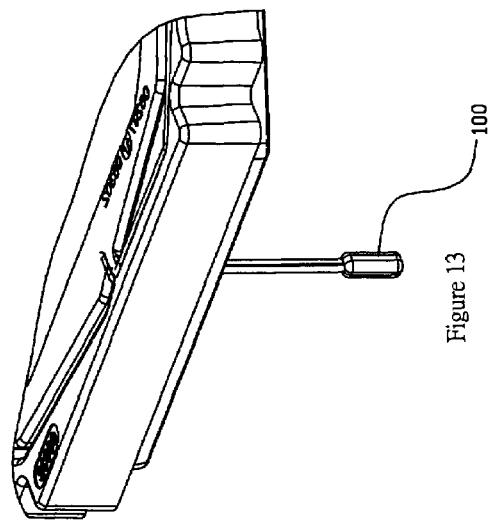
FIG. 10 is a cut away view showing the position of the disc detector of FIG. 5c.
Figure 11:
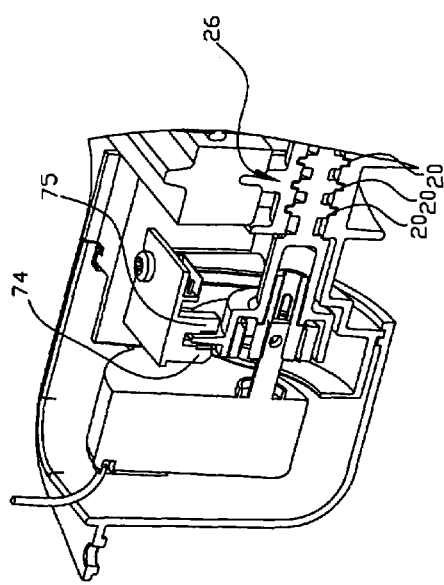
FIG. 11 shows in cut away manner the disc detector rotating out of open position to the closed position of FIG. 10.
Figure 12:
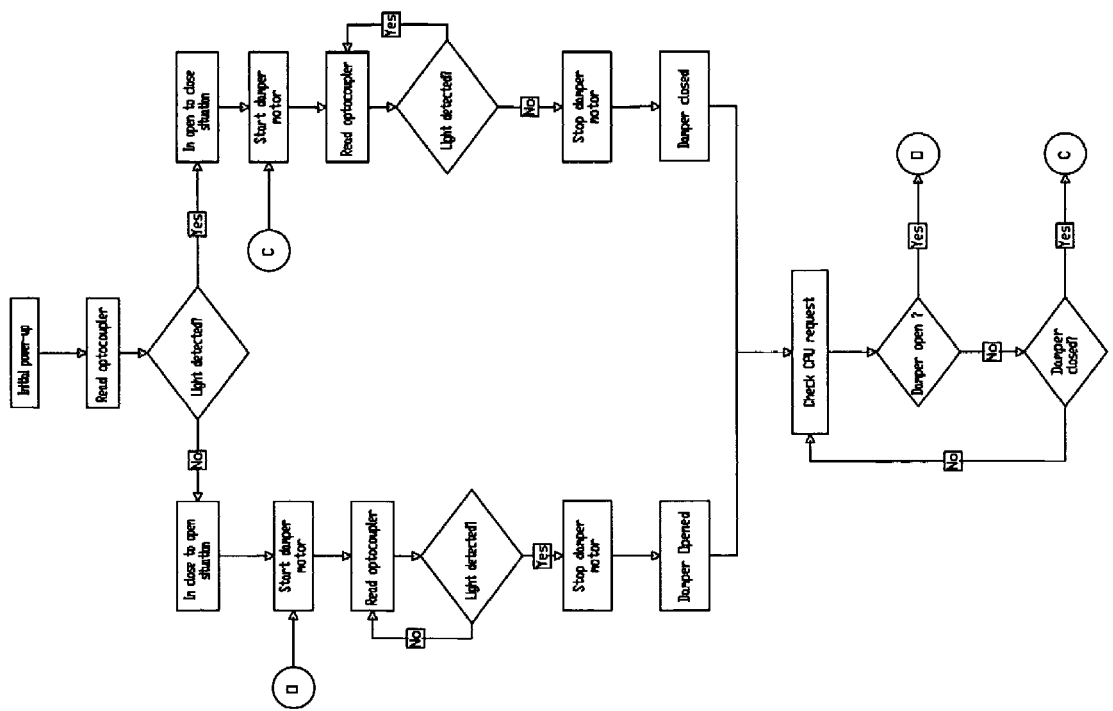
FIG. 12 shows an example logic scheme for CPU programming purposes in relation to the detection of the damper means in open or closed position.

The light source element 74 and light detection element 75 may take on any suitable electrical form (e.g. see in particular FIGS. 10 and 11). In operation and referring to FIG. 5c as the detection disc 72 rotates clockwise the disc 72 initially blocks the light from the light source element 74 at which point the damper member 30 is in the fully closed position; as the disc 72 continues to rotate it reaches a point wherein it no longer masks the light source element 74 at which point the damper member 30 is in the fully open position. At the fully open and fully closed position appropriate signals are sent to a system CPU (not shown) for evaluation and action (see FIG. 12).

The detection system may be configured to detect 5 differents states which are: Fully opened damper position, fully closed damper position, jammed opened damper position, jammed closed damper position, jammed in intermediate position damper position.

The detection system may for example be configure in any suitable manner to perform the following actions:

Fully opened damper position: the motor 22 when energized rotates the circle detection disc 70 which when damper 30 is fully opened block the Light emitting element 74 from sending its signal to the light detection element 75. That indicates a fully opened damper.

Fully closed damper position: the motor 22 when energized rotates the circle detection disc 72 which when damper 30 is fully closed unblock the Light emitting element 74 which now sends its signal to the light detection element 75. That indicates a fully closed damper.

Jammed in opened damper position: the motor 22 when energized does not rotates the circle detection disc 72 which still block the Light emitting element 74 from sending its signal to the light detection element 75. After blocking the signal for a certain number of second then the CPU detects that the damper is jammed opened. The system re-initialize the sequence a few times, otherwise it sends a signal saying to the user that the damper motor 22 is dead.

Jammed in fully closed damper position: the motor 22 when energized does not rotates the circle detection disc 72 which still unblock the Light emitting element 74 which still sends its signal to the light detection element 75. After not blocking the signal for a certain number of second then the CPU detects that the damper is jammed in closed position. The system re-initialize the sequence a few time, otherwise it sends a signal saying to the user that the damper motor 22 is dead.

Figure 13:
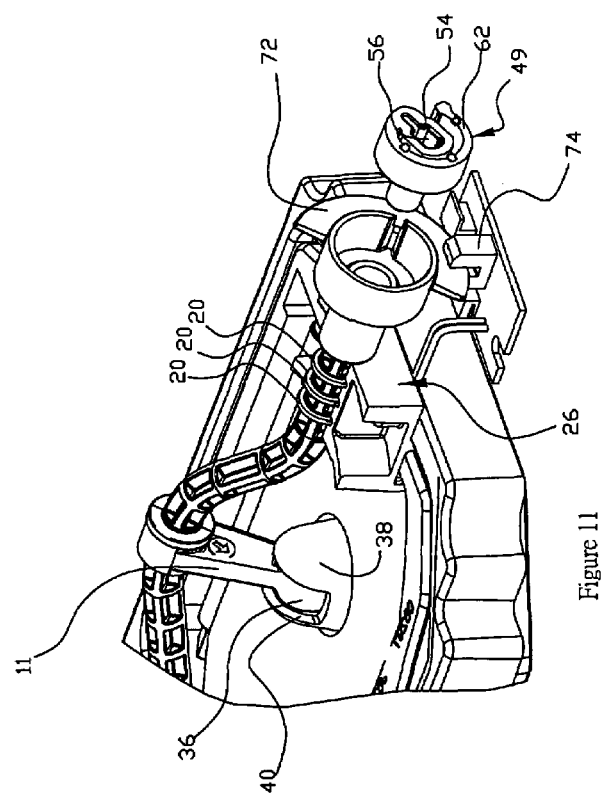
FIG. 13 illustrates in schematic fashion the positioning of a temperature sensor also connected to the CPU circuitry.

Jammed in intermediate state: the motor 22 when energized rotates the circle detection disc 72 which block or unblock (depending if the damper was previously closed or opened) the Light emitting element 74 from sending its signal to the light detection element 75, but after a certain number of second if the detection disc 72 does not reach its opposite position (Block or unblock which equal to opened or closed), then the CPU detects that the system is blocked in intermediate position (i.e the Coupling release component 49 has disengaged itself). The system re-initialize the sequence a few time, otherwise it sends a signal saying to the user that the damper 30 is blocked in intermediate position. It also detects a badly closed damper with its temperature sensor 100 as shown in FIG. 13.

Turning to FIG. 14 this figure is a perspective schematic view showing a damper assembly in accordance with the present invention attached to the housing of a ventilation device. The damper assembly may be attached to the ventilation housing in any suitable or desired manner for example by the use of screws 80. The damper assembly defines a respective part of a respective air path defined by the internal components of the ventilation device (internal air paths not shown). The damper assembly 90 thus defines a fresh air inlet into the ventilation device.

What is claimed is:

1. A damper assembly, comprising:
   a support means defining an opening;
   damper means pivotally mounted to said support means by pivot connection means,
   a crankshaft means rotationally mounted to said support means, said crankshaft means comprising a throw element,
   wherein said damper means is coupled to said throw element of said crankshaft means by a connector drive arm element, said throw element being rotatably connected to said connector drive arm element and said connector drive arm element being pivotably connected to said damper means such that a complete rotation of said crankshaft means in a single direction is able to induce said damper means to swing about said pivot connection means from a first damper position to a second damper position and back to said first damper position for adjusting air flow through said opening.

2. A damper assembly as defined in claim 1 wherein said assembly includes a coupling release means for releasably coupling shaft of a motor to said crankshaft means for rotation of the crankshaft means by the motor shaft, wherein the coupling release means is configured such that when a predetermined rotational force is produced by the motor, interlocking between the crankshaft means and the motor is released.

3. A damper assembly as defined in claim 2 wherein said motor provides a rotational force in a single direction.

4. A damper assembly as defined in claim 1 wherein said assembly includes a coupling release component for releasably coupling a shaft of a motor to said crankshaft means for rotation of the crankshaft means by the motor shaft, said coupling release component comprising:
   a rotation lock means comprising axially disposed first gripping means for connecting the lock means to the shaft of the motor for inducing rotation of said lock means by said motor,
   a slip coupling means comprising second gripping means disposed radially outwardly relative to the first gripping means configured to releasably interlock with a corresponding third gripping means of a further coupling means for connecting the coupling release component to said crankshaft means for the rotation thereof, and
   resilient mounting means mounting said second gripping means to said first gripping means so as to be able to exert a radially outward force on the second gripping means so as to radially bias the second gripping means into interlocking engagement with the third gripping means,
   wherein the second gripping means and the corresponding third gripping means are configured such that when a predetermined rotational force sufficient to overcome the radially outward bias of the resilient mounting means is produced, the interlocking between the second and third gripping means is released such that the second gripping means slips in relation to the further coupling means.

5. A damper assembly as defined in claim 4 wherein the second gripping means and the corresponding third gripping means are have angled engaging surfaces that are configured such that when a predetermined rotational force sufficient to overcome the radial bias of the resilient mounting means is produced, the interlocking between the second and third gripping means is released such that the second gripping means slips in relation to the further coupling means.

6. A damper assembly as defined in claim 1 further comprising damper position detection means comprising a first detection portion fixed to the support means and a second detection portion fixed to the crankshaft means, said damper position detection means being configured for detection of the disposition of the damper means in relation to its open and closed states including maximum open state, intermediate open states and jammed open and jammed closed states.

* * * * *